United States Patent
Shih et al.

(10) Patent No.: US 7,424,667 B2
(45) Date of Patent: Sep. 9, 2008

(54) DIGITAL DATA TRANSMISSION ERROR CHECKING METHOD AND SYSTEM

(75) Inventors: W. H. Shih, Taipei (TW); Chin-Fong Pan, Taipei (TW)

(73) Assignee: Inventec Corporation (TW)

( * ) Notice: Subject to any disclaimer, the term of this patent is extended or adjusted under 35 U.S.C. 154(b) by 548 days.

(21) Appl. No.: 11/215,914

(22) Filed: Aug. 30, 2005

(65) Prior Publication Data

US 2007/0061670 A1    Mar. 15, 2007

(51) Int. Cl.
*H03M 13/09*    (2006.01)
(52) U.S. Cl. ...................................... 714/807
(58) Field of Classification Search ................. 714/807
See application file for complete search history.

(56) References Cited

U.S. PATENT DOCUMENTS 4,947,396 A * 8/1990 Shin et al. ................... 714/768
5,343,530 A * 8/1994 Viricel .......................... 705/67
5,488,702 A * 1/1996 Byers et al. .................... 726/26
6,044,488 A * 3/2000 Liedtke ....................... 714/807
6,408,374 B1 * 6/2002 Calamvokis et al. ........ 711/216

* cited by examiner

*Primary Examiner*—Stephen M. Baker
(74) *Attorney, Agent, or Firm*—Peter F. Corless; Steven M. Jensen; Edwards Angell Palmer & Dodge LLP

(57) ABSTRACT

A digital data transmission error checking method and system is proposed, which is designed for use with a data source unit and a data reception unit for providing a error checking function, and which is characterized by the use of an improved checksum algorithm that initially sets a checksum variable to a fixed value and then repetitively increases the value of the checksum value by adding the value of each data unit in the original digital data stream plus the resulted value of an exclusive-OR operation on the previous checksum value and the index number of the current data unit in the original digital data stream. This feature allows the reception side to determine whether there are erroneous bits in the received data stream even if the sequential order of the bytes in the original digital data stream is mistakenly disordered.

6 Claims, 2 Drawing Sheets

DIGITAL DATA TRANSMISSION ERROR CHECKING METHOD AND SYSTEM

BACKGROUND OF THE INVENTION

1. Field of the Invention

This invention relates to information technology (IT), and more particularly, to a digital data transmission error checking method and system which is designed for use in conjunction with a data source unit (such as a network server) and a data reception unit (such as a network workstation) for providing an error checking function that allows the data reception unit to check whether a stream of digital data received from the data source unit has been subjected to transmission error.

2. Description of Related Art

Checksum is an error checking method that is widely utilized in computer and communications systems for checking whether errors occur in a stream of digital data (such as a file or a packet) during transmission from a data source unit to a data reception unit. If errors are found in the received data stream, the data reception unit will return a retransmission request message to the data source unit to request the data source unit to retransmit the data stream.

Presently, there are many varieties of checksum methods that have been developed in computer science. The most fundamental checksum method is simply to sum up all the values of data units (such as bytes, 16-bit words, or 32-bit words) in the data stream to obtain a transmission side checksum value, and then transmit the data stream together with the transmission side checksum value to the data reception unit. Subsequently, at the data reception unit, the same checksum algorithm is applied to the received data stream to obtain a reception side checksum value. Theoretically, if no errors occur during transmission, the reception side checksum value will be exactly equal to the transmission side checksum value; otherwise, if errors have occurred during transmission, the reception side checksum value would be unequal to the transmission side checksum value. Therefore, by comparing the reception side checksum value against the transmission side checksum value, the reception side is able to determine whether the received data stream is correct or not.

One drawback to the above-mentioned checksum method, however, is that it might become ineffective to determine transmission errors in some certain cases. For instance, for a data stream having 3 bytes {[12][23[[45]} which have been mistakenly disordered into {[23][12[[45]} during transmission, then in this case, the transmission side will obtain a checksum value of 12+23+45=7A (hexadecimal values), and the reception side will obtain a checksum value of 23+12+45=7A. Since the reception side checksum value 7A is exactly equal to the transmission side checksum value 7A, it will cause the reception side to wrongly determine that the received data stream is correct. There exists therefore a need in the information industry for a solution to this problem.

SUMMARY OF THE INVENTION

It is therefore an objective of this invention to provide an improved digital data transmission error checking method and system which allows the reception side to more reliably determine whether a received data stream from a data source unit has been subjected to transmission error.

The digital data transmission error checking method and system according to the invention is designed for use in conjunction with a data source unit (such as a network server) and a data reception unit (such as a network workstation) for providing an error checking function that allows the data reception unit to check whether a stream of digital data received from the data source unit has been subjected to transmission error.

The digital data transmission error checking method according to the invention comprises: (1) on the transmission side, performing a checksum computing procedure on an original digital data stream that is to be transmitted to the reception side to thereby obtain a transmission side checksum value based on a checksum algorithm that initially sets a checksum variable to a fixed value and then repetitively increases the value of the checksum value by adding the value of each data unit in the original digital data stream plus the resulted value of an exclusive-OR operation on the previous checksum value and the index number of the current data unit in the original digital data stream; (2) on the transmission side, appending the transmission side checksum value to the original digital data stream; (3) on the transmission side, transmitting the original digital data stream together with the appended transmission side checksum value to the reception side; (4) on the reception side, receiving a transmitted digital data stream together with an appended transmission side checksum value from the transmission side; (5) on the reception side, performing a checksum computing procedure on the transmitted digital data stream to obtain a reception side checksum value by using the same checksum computing procedure utilized on the transmission side; and (6) on the reception side, comparing the reception side checksum value against the appended transmission side checksum value in the transmitted digital data stream; if unmatched, issuing a transmission error message.

In terms of concrete architecture, the digital data transmission error checking system according to the invention comprises: (A) a transmission side processing unit; and (B) a reception side processing unit; wherein the transmission side processing unit is installed on the data source unit and whose internal architecture includes: (A1) a transmission side checksum computing module, which is capable of performing a checksum computing procedure on an original digital data stream that is to be transmitted to the data reception unit to obtain a transmission side checksum value based on a checksum algorithm that initially sets a checksum variable to a fixed value and then repetitively increases the value of the checksum value by adding the value of each data unit in the original digital data stream plus the resulted value of an exclusive-OR operation on the previous checksum value and the index number of the current data unit in the original digital data stream; (A2) a checksum appending module, which is capable of appending the transmission side checksum value obtained by the transmission side checksum computing module to the original digital data stream; and (A3) a transmission module, which is capable of transmitting the original digital data stream together with the transmission side checksum value appended by the checksum appending module to the data reception unit; and wherein the reception side processing unit is installed on the data reception unit, and whose internal architecture includes: (B1) a reception module, which is capable of receiving a transmitted digital data stream together with an appended transmission side checksum value from the data source unit; (B2) a reception side checksum computing module, which is capable of performing a checksum computing procedure on the transmitted digital data stream to obtain a reception side checksum value by using the same checksum computing procedure that is performed by the transmission side checksum computing module in the transmission side processing unit installed on the data source unit; and (B3) a checksum comparison module, which is capable of comparing the reception side checksum value obtained by the reception side checksum computing module against the appended transmission side checksum value in the transmitted digital data stream received by the reception module; if unmatched, capable of issuing a transmission error message.

The digital data transmission error checking method and system according to the invention is characterized by the use of an improved checksum algorithm that initially sets a checksum variable to a fixed value (such as 0) and then repetitively increases the value of the checksum value by adding the value of each data unit in the original digital data stream plus the resulted value of an exclusive-OR operation on the previous checksum value and the index number of the current data unit in the original digital data stream. This feature allows the reception side to determine whether there are erroneous bits in the received data stream even if the sequential order of the bytes in the original digital data stream is mistakenly disordered.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The digital data transmission error checking method and system according to the invention is disclosed in full details by way of preferred embodiments in the following with reference to the accompanying drawings.

Figure 1:
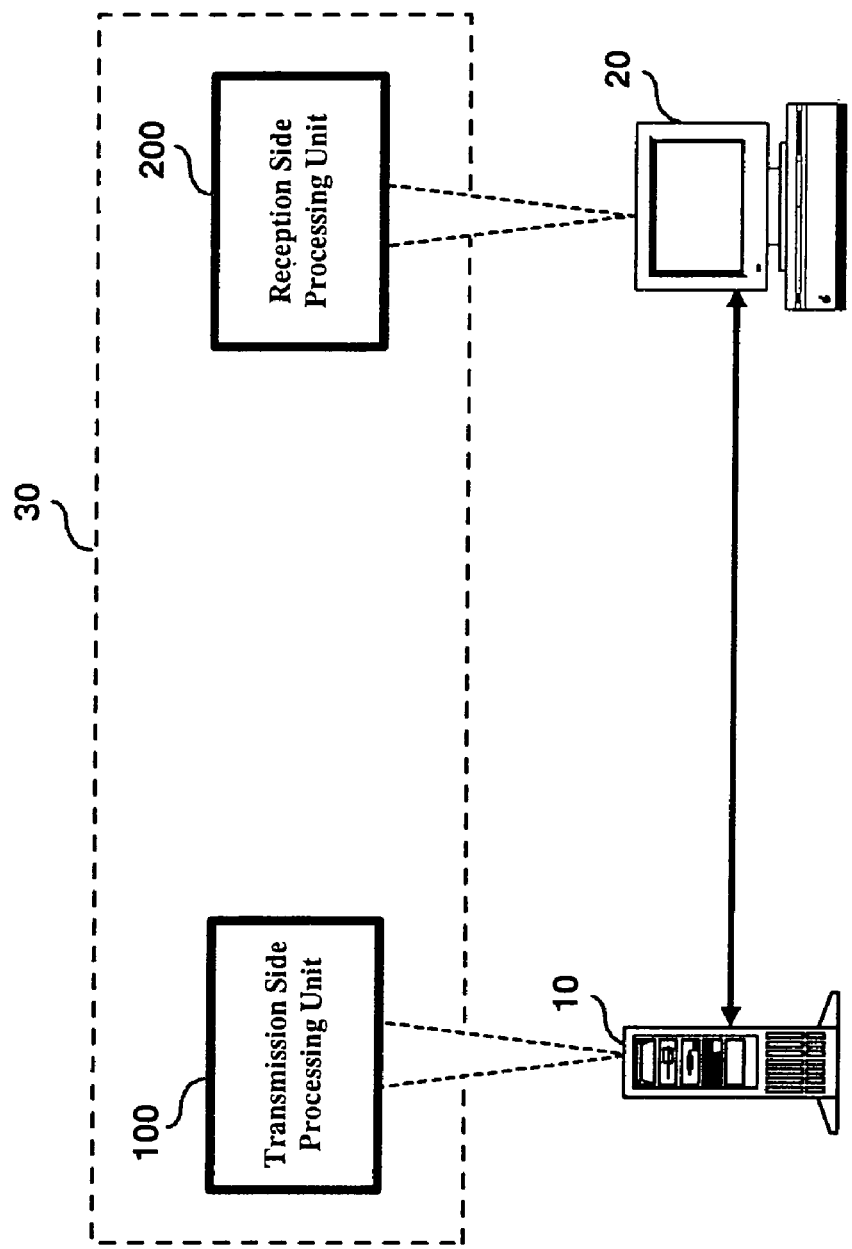
FIG. 1 is a schematic diagram showing the application and distributed system architecture of the digital data transmission error checking system according to the invention.

FIG. 1 is a schematic diagram showing the application and distributed system architecture of the digital data transmission error checking system according to the invention (as the part enclosed in the dotted box indicated by the reference numeral 30). As shown, the digital data transmission error checking system of the invention 30 is designed for use in conjunction with a data source unit 10 and a data reception unit 20 for providing an error checking function that allows the data reception unit 20 to check whether a stream of transmitted digital data stream received from the data source unit 10 has been subjected to transmission error or not. In practical applications, for example, the data source unit 10 and the data reception unit 20 can be respectively a network server and a network workstation, or respectively a computer peripheral device (such as a hard disk drive or a CD-ROM drive) and a computer platform, to name just a few.

Figure 2:
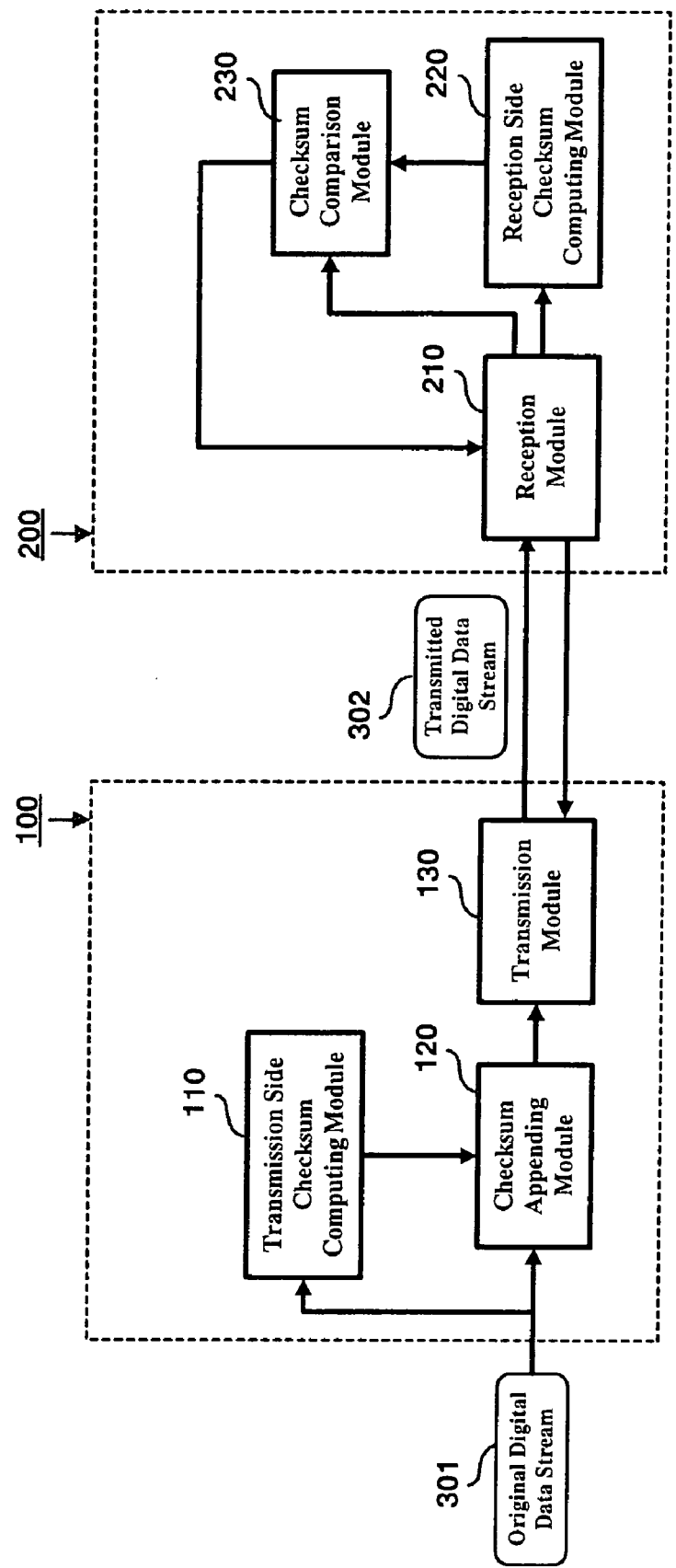
FIG. 2 is a schematic diagram showing the internal architecture of the transmission side processing unit and the reception side processing unit utilized by the digital data transmission error checking system according to the invention.

As shown in FIG. 1, the modularized object-oriented component model of the digital data transmission error checking system of the invention 30 comprises two distributed units: (A) a transmission side processing unit 100; and (B) a reception side processing unit 200; wherein the transmission side processing unit 100 is installed on the data source unit 10 and whose internal architecture, as shown in FIG. 2, includes: (A1) a transmission side checksum computing module 110; (A2) a checksum appending module 120; and (A3) a transmission module 130; while the reception side processing unit 200 is installed on the data reception unit 20 and whose internal architecture, as shown in FIG. 2, includes: (B1) a reception module 210; (B2) a reception side checksum computing module 220; and (B3) a checksum comparison module 230.

Firstly, the respective attributes and functions of the constituent modules 110, 120, 130 of the transmission side processing unit 100 are described in the following.

The transmission side checksum computing module 110 is capable of performing a checksum computing procedure on an original digital data stream 301, which can be either a file or a packet, that is to be transmitted to the data reception unit 20. The checksum computing procedure is based on an improved checksum algorithm to obtain a transmission side checksum value, where the improved checksum algorithm includes the following steps S(1)-S(3):

(S1) Detect the total number of data units (i.e., bytes in this embodiment) in the original digital data stream 301 and store the detected value in the variable CNT; and also detect the respective values of all the data units in the original digital data stream 301 and store the detected values in the array DATA (i), i=0 to CNT−1;

(S2) Set CHECKSUM=0;

(S3) For n=0 to CNT−1

$$CHECKSUM=(CHECKSUM\ XOR\ n)+DATA(n)$$

In step S(2), the variable CHECKSUM is initially set to a fixed value, such as 0; and in step S(3), a sequence of summing steps are performed for each data unit in the original digital data stream 301 by repetitively increasing the checksum value by adding the value of each data unit (i.e., DATA (n), n=1 to CNT−1) in the original digital data stream 301 plus the resulted value of an exclusive-OR operation on the previous checksum value and the index number of the current data unit (i.e., n) in the original digital data stream. The finally obtained CHECKSUM value is then used as the transmission side checksum value.

The checksum appending module 120 is capable of appending the transmission side checksum value obtained by the transmission side checksum computing module 110 to the original digital data stream 301, so as to allow the transmission side checksum value to be transmitted to the data reception unit 20 together with the original digital data stream 301.

The transmission module 130 is capable of transmitting the original digital data stream 301 together with its transmission side checksum value appended by the checksum appending module 120 through a transmission channel to the data reception unit 20. Furthermore, if the transmission module 130 receives a transmission error message from the data reception unit 20, it will retransmit the original digital data stream 301 again to the data reception unit 20.

Next, the respective attributes and functions of the constituent modules 210, 220, 230 of the reception side processing unit 200 are described in the following.

The reception module 210 is capable of receiving a transmitted digital data stream 302 together with an appended transmission side checksum value that are transmitted by the transmission module 130 in the transmission side processing unit 100 on the data source unit 10. Since transmission error could occur along the transmission channel, the transmitted digital data stream 302 may not be exactly the same as the original digital data stream 301.

The reception side checksum computing module 220 is capable of performing a checksum computing procedure on the transmitted digital data stream 302 to obtain a reception side checksum value by using exactly the same checksum algorithm that is performed by the transmission side checksum computing module 110 in the transmission side processing unit 100 on the data source unit 10.

The checksum comparison module 230 is capable of comparing the reception side checksum value obtained by the reception side checksum computing module 220 against the appended reception side checksum value in the transmitted digital data stream 302 from the data source unit 10 received by the reception module 210. If matched, it indicates that the transmitted digital data stream 302 is error-free after transmission, and therefore the checksum comparison module 230 will issue a transmission correct message to the reception module 210, whereupon the reception module 210 will transfer the transmitted digital data stream 302 to the data reception unit 20 for further processing; and whereas if unmatched, it indicates that the transmitted digital data stream 302 contains erroneous bits, and therefore the checksum comparison module 230 will issue a transmission error message and activate the reception module 210 to return the transmission error message back to the transmission module 130 in the transmission side processing unit 100 to request the transmission module 130 to retransmit the original digital data stream 301 again.

In the following description of an example of a practical application of the invention, it is assumed that the data source unit 10 wants to transmit an original digital data stream 301 to the data reception unit 20, where the original digital data stream 301 is composed of a sequence of 3 bytes {[12][23[[45]}, and during the transmission, error occurs such that the transmitted digital data stream 302 becomes {[23][12[[45]}.

On the transmission side, the original digital data stream 301 will be first processed by the transmission side checksum computing module 110, which performs a transmission side checksum computing procedure on the original digital data stream 301 based on the algorithmic steps S(1) through S(3); wherein in step S(1), it is obtained that CNT=3, DATA(0)=[12], DATA(1)=[23], and DATA(2)=[45]; in the next step S(2), the variable CHECKSUM1 is initialized to 0; and in the final step S(3), it is obtained that CHECKSUM1=79 (hexadecimal value). Subsequently, the checksum appending module 120 appends the obtained transmission side checksum value CHECKSUM1=79 to the original digital data stream 301 for the transmission module 130 to transmit the original digital data stream 301 together with the appended checksum value CHECKSUM1=79 to the data reception unit 20. During the transmission, it is assumed that the original digital data stream 301 is mistakenly disordered into a wrong sequence {[23][12[[45]]}.

On the reception side, the transmitted digital data stream 302 and its appended checksum value CHECKSUM1=79 are received by the reception module 210 and then transferred to the reception side checksum computing module 220 for the reception side checksum computing module 220 to perform a reception side checksum computing procedure on the transmitted digital data stream 302 by using the same algorithmic steps S(1) through S(3); wherein in step S(1), it is obtained that CNT=3, DATA(0)=[23], DATA(1)=[12], and DATA(2)=[45]; in the next step S(2), a variable CHECKSUM2 is initialized to 0; and in the final step S(3), it is obtained that CHECKSUM2=7B (hexadecimal value). Subsequently, the checksum comparison module 230 is activated to compare the reception side checksum value CHECKSUM2 against the reception side checksum value CHECKSUM1 appended in the transmitted digital data stream 302 received by the reception module 210. Since CHECKSUM1=79 and CHECKSUM2=7B, the comparison result is a mismatch; and therefore, the checksum comparison module 230 responds to this condition by issuing a transmission error message which is then transferred by the reception module 210 to the transmission module 130 in the transmission side processing unit 100, requesting the transmission module 130 to retransmit the original digital data stream 301.

On the contrary, if the original digital data stream 301 was correctly transmitted to the reception module 210, then the reception side checksum computing module 220 will obtain a checksum value of CHECKSUM2=79, which is exactly equal to the transmission side checksum value CHECKSUM1=79 appended in the original digital data stream 301. In this case, the checksum comparison module 230 will issue a transmission correct message to the reception module 210, whereupon the reception module 210 will transfer the received digital data stream 302 to the data reception unit 20 for further processing.

In conclusion, the invention provides a digital data transmission error checking method and system for use with a data source unit and a data reception unit for providing a error checking function, and which is characterized by the use of an improved checksum algorithm that initially sets a checksum variable to a fixed value and then repetitively increases the value of the checksum value by adding the value of each data unit in the original digital data stream plus the resulted value of an exclusive-OR operation on the previous checksum value and the index number of the current data unit in the original digital data stream. This feature allows the reception side to determine whether there are erroneous bits in the received data stream even if the sequential order of the bytes in the original digital data stream is mistakenly disordered. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A digital data transmission error checking method for use on a transmission side and a reception side for providing an error checking function;

the digital data transmission error checking method comprising:

on the transmission side, performing a checksum computing procedure on an original digital data stream that is to be transmitted to the reception side to thereby obtain a transmission side checksum value based on a checksum algorithm that initially sets a checksum variable to a fixed value and then repetitively increases the value of the checksum value by adding the value of each data unit in the original digital data stream plus the resulted value of an exclusive-OR operation on the previous checksum value and the index number of the current data unit in the original digital data stream;

on the transmission side, appending the transmission side checksum value to the original digital data stream;

on the transmission side, transmitting the original digital data stream together with the appended transmission side checksum value to the reception side;

on the reception side, receiving a transmitted digital data stream together with an appended transmission side checksum value from the transmission side;

on the reception side, performing a checksum computing procedure on the transmitted digital data stream to obtain a reception side checksum value by using the same checksum computing procedure utilized on the transmission side; and on the reception side, comparing the reception side checksum value against the appended transmission side checksum value in the transmitted digital data stream; if unmatched, issuing a transmission error message.

2. The digital data transmission error checking method of claim 1, wherein the transmission side and the reception side are respectively a network server and a network workstation.

3. The digital data transmission error checking method of claim 1, wherein the transmission side and the reception side are respectively a computer peripheral device and a computer platform.

4. A digital data transmission error checking system for use with a data source unit and a data reception unit for providing an error checking function;

the digital data transmission error checking system comprising a transmission side processing unit and a reception side processing unit; wherein the transmission side processing unit is installed on the data source unit and whose internal architecture includes:

a transmission side checksum computing module, which is capable of performing a checksum computing procedure on an original digital data stream that is to be transmitted to the data reception unit to obtain a transmission side checksum value based on a checksum algorithm that initially sets a checksum variable to a fixed value and then repetitively increases the value of the checksum value by adding the value of each data unit in the original digital data stream plus the resulted value of an exclusive-OR operation on the previous checksum value and the index number of the current data unit in the original digital data stream;

a checksum appending module, which is capable of appending the transmission side checksum value obtained by the transmission side checksum computing module to the original digital data stream; and a transmission module, which is capable of transmitting the original digital data stream together with the transmission side checksum value appended by the checksum appending module to the data reception unit; and wherein the reception side processing unit is installed on the data reception unit, and whose internal architecture includes:

a reception module, which is capable of receiving a transmitted digital data stream together with an appended transmission side checksum value from the data source unit;

a reception side checksum computing module, which is capable of performing a checksum computing procedure on the transmitted digital data stream to obtain a reception side checksum value by using the same checksum computing procedure that is performed by the transmission side checksum computing module in the transmission side processing unit installed on the data source unit; and a checksum comparison module, which is capable of comparing the reception side checksum value obtained by the reception side checksum computing module against the appended transmission side checksum value in the transmitted digital data stream received by the reception module; if unmatched, capable of issuing a transmission error message.

5. The digital data transmission error checking system of claim 4, wherein the data source unit and the data reception unit are respectively a network server and a network workstation.

6. The digital data transmission error checking system of claim 4, wherein the data source unit and the data reception unit are respectively a computer peripheral device and a computer platform.

* * * * *